Patented July 8, 1941

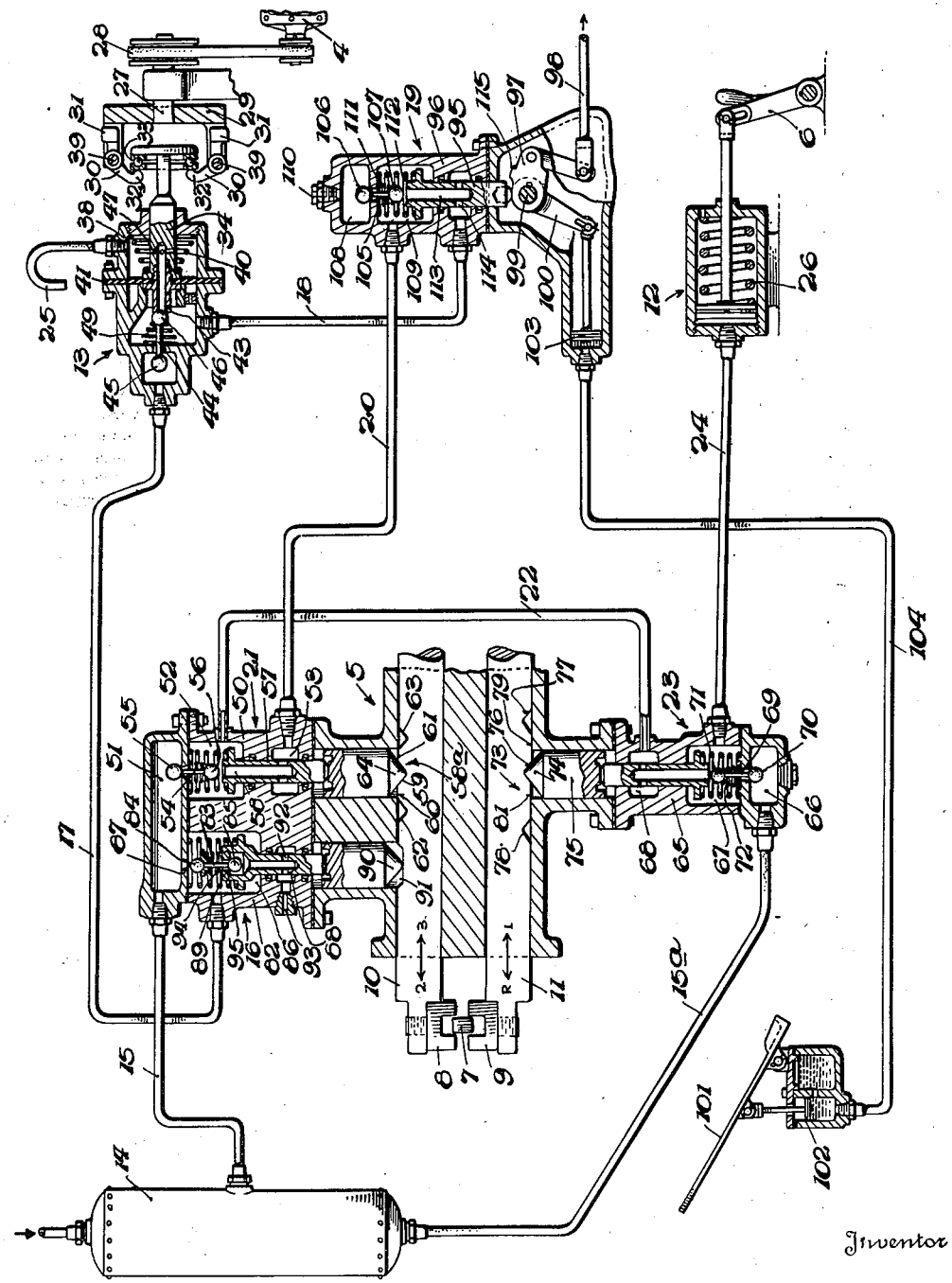

2,248,431

UNITED STATES PATENT OFFICE 2,248,431

GEAR SHIFTING MECHANISM

Arthur R. Leukhardt, New York, N. Y., assignor to Bendix-Westinghouse Automotive Air Brake Company, Pittsburgh, Pa., a corporation of Delaware Application March 11, 1939, Serial No. 261,360

21 Claims. (Cl. 192—.01)

This invention relates to motor vehicle control mechanisms and more particularly to a mechanism enabling coordinated control of the vehicle transmission and clutch.

Vehicle control mechanisms have heretofore been provided wherein provision has been made for coordinated control of the vehicle transmission and clutch. In certain of the prior constructions, the clutches have been controlled by power operators and the latter have in turn been governed not only by operation of the vehicle transmission but also by automatic control means responsive to the speed of the vehicle engine. Such arrangements have been constituted in such a manner that, due to the action of the speed-responsive means, disengagement and engagement of the clutch occurs during a certain range of engine speeds. Thus, below this range, the clutch is disengaged, while, above the predetermined range, the clutch is engaged.

One disadvantage which has been ascertained in using a construction of the above type is that of clutch slippage and consequent undue wear. For example, if a vehicle equipped with a mechanism such as has been above outlined were proceeding up a steep grade at low speed, or were otherwise required to exert a large tractive effort, it would be possible for the clutch to slip and thus not transmit the necessary torque. Moreover, if the vehicle were proceeding in high or second gear and the vehicle speed were reduced to such an extent that the engine speed dropped to the predetermined speed range of operation of the speed-responsive control device, the latter might function to cause partial clutch disengagement.

One of the objects of the present invention is to accordingly provide a novel transmission and clutch-controlling arrangement which will be so constituted as to avoid the above difficulties and disadvantages.

Another object is to provide, in a mechanism of the foregoing type, and wherein speed-responsive means are employed for controlling the operation of a power clutch operator, a novel arrangement for positively effecting engaging action of the clutch independently of the speed-responsive means.

Another object is to utilize, in a novel manner, the throttle-controlling member of the engine, for simplifying the operation of the mechanism and for avoiding clutch slippage.

Still another object contemplates the elimination of the possibility of clutch disengagement through the action of the speed-responsive means when the vehicle is proceeding in second or high gear while maintaining the function of the control of clutch engagement by the speed-responsive means as governed by the novel cooperation with the throttle-controlling member.

A further object resides in a novel arrangement of vehicle controls enabling efficient operation of the vehicle with a substantially reduced number of operations necessary to be performed by the operator, thus greatly simplifying the operation of motor vehicles.

Other objects and novel features of the invention will appear more fully hereinafter from the following detailed description when taken in connection with the accompanying drawing, the single figure of which illustrates one embodiment of the invention in diagrammatic form, certain parts being shown in section. It is to be expressly understood, however, that the drawing is utilized for purposes of illustration only and is not designed as a definition of the limits of the invention, reference being had for this purpose to the appended claims.

Referring to the drawing, the present invention is illustrated therein in connection with a motor vehicle having an engine 4, a ratio-changing transmission 5 and a clutch-controlling member 6. The transmission is adapted to be manually operated through movement of a lever 7 which may selectively engage one or the other of members 8 or 9 respectively carried by shift rails 10 and 11. The latter are associated with the ratio-changing gearing of the transmission in a manner well known in the art, it being desired to point out that, in the illustrated form, movement of the shift rail 10 to the left and right respectively establishes second and third gear ratio, while corresponding movement of the shift rail 11 respectively establishes reverse or first gear ratio. The clutch-controlling member 6 is adapted to be operated by a fluid motor 12 and the construction is such that, during operation of the gear-shifting mechanism, the clutch-controlling member 6 will be automatically controlled to the end that the vehicle clutch may be efficiently engaged and disengaged in proper sequence with changes in the transmission gear ratio.

Means are provided for controlling the clutch-engaging and disengaging movements of clutch-controlling member 6 during changes in the transmission gear ratios, and, preferably, such means are so constructed that the clutch is disengaged when the engine 4 is idling and is permitted to engage when the engine speed is gradually increased. As shown, such means include a centrifugally-controlled valvular mechanism 13 which is constructed in such a manner that, with the engine 4 idling, the valvular mechanism 13 serves to conduct fluid pressure from a reservoir 14 to the clutch motor 12 by way of conduit 15, valve 16, conduit 17, valvular mechanism 13, conduit 18, valvular mechanism 19, conduit 20, valvular mechanism 21, conduit 22, valve device 23 and conduit 24. When the speed of the engine 4 is increased above idling speed, valvular mechanism 13 operates in such a manner as to exhaust the fluid from the clutch motor 12 through conduit 24, valve device 23, conduit 22, valvular mechanism 21, conduit 20, valvular mechanism 19, conduit 18 and an exhaust conduit 25, and the construction is such that the fluid pressure is gradually exhausted, thus permitting the vehicle clutch to be smoothly engaged through the action of the usual clutch return springs associated therewith, aided by a return spring 26 housed within the clutch motor 12.

Referring more particularly to the centrifugally-operated valvular mechanism 13, the same includes a shaft 27 drivably connected at one end with the engine through a belt and pulley drive 28, the other end of the shaft having a rotor 29 secured thereto and provided with a plurality of centrifugally-actuated levers 30. The levers 30 include a weighted arm 31 and an actuating arm 32, the latter being adapted to cooperate with a bearing 33 which is capable of sliding movement with respect to the rotor. Bearing 33 is adapted to abut one end of a valve-actuating member 34. From this construction, it will be readily perceived that, as the speed of the rotor 29 increases, centrifugal force will effect a movement of levers 30 about pivot pins 39 in order to cause arms 32 to move bearing 33 and valve-actuating member 34 to the right, as viewed in the drawing. The latter member is normally urged toward the left through a spring 40 confined between a portion of casing 38 and diaphragm 41 secured to member 34 as by means of element 43.

The valvular mechanism 13, in addition to the centrifugally-operated actuating device heretofore described, also includes a valve structure comprising a valve 44 provided with intake and exhaust heads 45 and 46 respectively, the intake head, when open, serving to connect conduits 17 and 18 and the exhaust valve head 46, when open, serving to connect conduits 18 and 25. This latter connection includes a plurality of ports 47 positioned in the member 34 and also includes the member 43 which is hollow and is adapted to form, at its left-hand extremity, a seat for the exhaust valve head 46. The valve 44 has associated therewith a spring 49 which constantly tends to seat the intake valve head.

Preferably, the parts of the centrifugally-operated valvular mechanism 13 are so initially adjusted that, with the engine idling, the spring 40 serves to move valve-actuating member 34 to the left in order to effect contact between member 43 and exhaust valve head 46 and lift the intake valve 45 off its seat. Under these conditions, fluid pressure will be conducted from conduit 17 to conduit 18, and, as heretofore described, the clutch motor will be energized in order to effect disengagement of the vehicle clutch. When engagement of the clutch is desired, the engine speed is increased and the valve-actuating member 34 will be moved to the right, as viewed in the drawing, through the action of the centrifugally-operable weights 31. Thus the intake valve head 45 will be closed by means of spring 49 and member 43 will be moved away from the exhaust valve head 46 in order to gradually connect conduit 18 with the atmospheric exhaust conduit 25. Thus the vehicle clutch may be smoothly engaged through the control of the engine speed.

The invention as herein disclosed, in addition to embodying the structure heretofore described, which secures the highly desirable and advantageous results outlined, moreover, is constituted in such a manner that, regardless of the speed of the engine and the operation of valvular mechanism 13, disengagement of the vehicle clutch is assured during each change in gear. To this end, valvular mechanisms 21 and 23 are associated with the shift rails 10 and 11 respectively. As shown, the valvular mechanism 21 includes a casing 50 provided with inlet, outlet and exhaust chambers 51, 52 and 53 respectively, a valve 54 being housed within the casing and having an intake head 55 positioned within chamber 51 and an exhaust head 56 located within chamber 52. A valve-actuating member 57 is slidably mounted within the casing 50 and its upper portion is provided with a bore 58 functioning as an exhaust valve seat for head 56 and also serving to connect chamber 52 with chamber 53 when the member 57 is moved out of contact with respect to head 56. The valve-actuating member 57 is operated by a suitable cam mechanism 58a carried by the shift rail 10, the cam mechanism being formed with a centrally-disposed cam depression 59, a pair of raised cam portions 60 and 61 disposed on either side thereof, and depressions 62 and 63 disposed adjacent cams 60 and 61. With such an arrangement and with the transmission in the neutral position illustrated, the lower end 64 of valve-actuating member 57 will be received within the cam depression 59, and thus exhaust valve head 56 will be opened and conduits 20 and 22 will be connected through chamber 52, bore 58 and chamber 53. Thus, fluid pressure will be conducted from the conduit 20 leading from the valvular mechanism 13 to the conduit 22 associated with the valvular mechanism 23, and, since the latter is opened when the transmission is in neutral, fluid pressure will be conducted to the clutch motor 12 and the vehicle will be disengaged with the engine idling. With the control mechanism in such condition, movement of the lever 7 to engage member 8 and shift the rail 10 in either direction from neutral position will, through cams 60 or 61, serve to move member 57 upwardly, as viewed in the drawing, in order to close exhaust valve 56 and open intake valve 55. When the latter valve is opened, fluid pressure is conducted from the reservoir 14 to the clutch motor 12 by way of conduit 15, interconnected chambers 51 and 52, conduit 22, valvular mechanism 23 and conduit 24. After completion of gear-shifting movement of the rail 10, the cam portions 62 or 63 will receive the end 64 of member 57 and the valvular mechanism 21 will be returned to the position shown on the drawing where the centrifugally-controlled valvular mechanism 13 may control the exhausting of fluid pressure from the clutch motor 12. Thus, the valve mechanism 21 insures disengagement of the vehicle clutch prior to establishment of any gear relation controlled by shift rail 10 and irrespective of the centrifugally-controlled valvular mechanism 13.

The valvular mechanism 23 is similar in construction to the valvular mechanism 21 and includes a casing 65 forming intake, outlet and exhaust chambers 66, 67 and 68 respectively. A valve 69 having intake and exhaust heads 70 and 71 is normally resiliently urged as by means of spring 72 into the position shown wherein the intake valve 70 is closed and cuts off communication between conduits 15a and 24. The shift rail 11 is provided with a cam mechanism 73 similar to cam mechanism 58 associated with valve 21, and, when the shift rail 11 is in neutral or either extreme of its movement to right or left, end 74 of valve-actuating member 75 will contact cam depressions 76, 77 or 78 respectively. During shifting movement of rail 11 in either direction from neutral position, end 74 will be engaged by raised cams 79 or 81 to move valve-actuating member 75 to such position that communication between conduits 22 and 24 is cut off while the latter conduit is connected to conduit 15a communicating with reservoir 14. Thus, during gear-shifting movements of the shift rail 11, valve mechanism 23 will be effective to control the flow of fluid pressure to the clutch motor 12 by way of conduit 15a. Hence, during shifting of the transmission gears, the vehicle clutch will be disengaged regardless of the speed of the engine and the operation of the centrifugally-controlled valvular mechanism 13.

In order to prevent the centrifugally-controlled valvular mechanism from supplying fluid pressure to the clutch motor when the vehicle transmission is operated to effect the establishment of certain gear ratios, means are provided for disconnecting the said valvular mechanism from the source of fluid pressure whenever a shift to such predetermined gear ratio is desired. Preferably, such means are so constituted that this disconnection of the source of fluid pressure from the valve mechanism is effected when shifting to second or third gear ratio. As shown, such means include the valvular mechanism 16 which comprises a casing 82 having a valve 83 therein provided with intake and exhaust heads 84 and 85. Conduit 17 communicates with outlet chamber 86 and with the shift rail 10 in neutral position, head 84 is spaced from seat 87, thus connecting chambers 86 and 51. In this manner, fluid pressure is conducted from reservoir 14 to the valve mechanism 13. Valve 83 is carried by an actuating member 88, the latter being normally urged, as by spring 89, to such a position that end 90 is received in cam groove 91. Member 88 is hollow and communicates through opening 92 with an atmospheric port 93. A spring 94 is utilized for urging valve 83 to the position shown where exhaust head 85 contacts seat 95, thus closing communication between chamber 86 and port 93. It will be readily understood that, with this construction, movement of shift rail 10 in either direction to establish second or third gear ratio will effect closure of valve head 84 as end 90 of member 88 is cammed upwardly by the sides of depression 91. Thus, communication between reservoir 14 and the centrifugally-controlled valvular mechanism 13 will be interrupted and the conduit 17 leading to the latter will be connected to atmospheric port 93 by way of chamber 86, past open exhaust head 85, member 88 and port 92. Thus, when the transmission is shifted to second or third gear, the centrifugally-operable valve 13 will be ineffective to cause clutch disengagement regardless of the speed of the vehicle engine.

While the valve mechanisms 21 and 23 heretofore described serve to control the clutch-disengaging movement of the clutch motor 12 under certain conditions, it will be readily perceived that the association of these valves with the centrifugally-controlled valve 13 is such that the latter controls the exhaust of fluid pressure from the motor 12 and thus the engagement of the vehicle clutch, irrespective of the gear ratio established by the transmission mechanism. This will be readily understood when it is considered that conduit 18, connected with the centrifugally-controlled valve, is always connected with conduit 24 associated with the clutch motor 12 whenever the valves 21 and 23 are in the position shown in the drawing or in the position where the valve-actuating members thereof are received in cam depressions 62, 63 or 77, 78. Such cam depressions are engaged when the transmission is established in a gear ratio. Thus, although, when second or third gear relation is established, the valves serve to control the disengagement of the vehicle clutch, still, after establishment of the second or third gear relation, the exhaust of fluid from the clutch motor will be controlled by the centrifugally-operable valve mechanism. Hence the latter efficiently controls engagement of the clutch irrespective of the gear ratio established by the transmission mechanism.

In certain instances, it may be desirable to exhaust the clutch motor 12 in order to permit engagement of the vehicle clutch irrespective of the operation of the centrifugally-controlled valvular mechanism 13. It will be recalled that, during operation of the latter valvular mechanism to control clutch engagement after the establishment of a certain gear relation, the exhausting of fluid pressure from the motor 12 is governed by the speed of the vehicle engine. If, for example, a portion of the fluid pressure in clutch motor 12 has been exhausted so that the plates of the clutch are in light engagement and it is necessary that the clutch transmit a relatively large torque, the speed of the engine might not increase to a sufficient value as to exhaust the remaining fluid pressure in the clutch motor. Such a condition might arise in the event that the front wheel of the vehicle were abutting an obstruction such as a curbing.

Means are, therefore provided for positively exhausting the fluid pressure from clutch motor 12 at the will of the operator. Preferably, such means are so arranged as to be operable in conjunction with the throttle of the vehicle engine, the construction being such that, when the throttle is opened to a predetermined value, the clutch motor 12 will be positively connected to the atmosphere. As shown, such means include the valve device 19 which is interposed between conduits 18 and 20. Such valve device includes a valve-actuating member 95 slidably mounted in a casing 96, the lower end of the valve-actuating member being in operative engagement with a cam 97 operatively connected with a throttle-operating member 98. In the particular embodiment of the invention illustrated herein, the cam 97 is oscillatable about a shaft 99 by means of a lever 100, the latter being moved proportionately to the movement of an accelerator pedal 101. The connections between the accelerator pedal 101 and lever 100 may take any form desired, a hydraulic embodiment including pistons 102 and 103 and a hydraulic conduit 104 interconnecting these pistons being shown herein by way of illustration.

Valve 19 includes a valve 105 having intake and exhaust heads 106 and 107 respectively positioned in chambers 108 and 109. Chamber 108 communicates with the atmosphere through opening 110, a spring 111 being provided for normally maintaining valve 105 in the position shown whereby communication between chambers 108 and 109 is interrupted. A spring 112 normally urges the valve-actuating member 95 downwardly in order to connect chamber 109 with conduit 18 through a bore 113 and ports 114 positioned in the valve-actuating member 95.

During ordinary manipulations of the accelerator pedal 101, lever 100, cam 97 and throttle-operating member 98 will be proportionately moved in order to effect control of the engine throttle. In the event, however, that the accelerator pedal 101 is operated to such a predetermined position that raised cam portion 115 of cam 97 engages and lifts the lower end of valve-actuating member 95, it will be readily observed that the latter will be moved upwardly in order to contact exhaust valve head 107. When this occurs, communication between conduits 20 and 18 is interrupted. Upon continued upward movement of valve-actuating member 95, intake valve head 106 will be raised from its seat and chamber 109 will be connected to chamber 108 and to atmosphere by way of opening 110. Thus, conduit 20, communicating with the clutch motor 12 through the connections heretofore described, will be connected to the atmosphere and the clutch motor will thereby be exhausted in order to permit reengagement of the vehicle clutch. It will be readily perceived that, when this action takes place, the engagement of the clutch will be effected independently of the operation of the centrifugally-operated valvular mechanism 13. Thus, regardless of the degree of torque necessary to be transmitted by the clutch, the latter will be positively permitted to become engaged through the action of the usual return springs associated therewith aided by spring 26 in clutch motor 12.

While one embodiment of the present invention has been illustrated and described herein with considerable particularity, it is to be understood that the same is not limited thereto but may be embodied in a variety of expressions as well understood by those skilled in the art. Reference will, therefore, be had to the appended claims for a definition of the limits of the invention.

What is claimed is:

1. In combination with an automotive vehicle engine having a throttle-controlling member, a gear-changing mechanism including a plurality of members operable to establish different gear ratios, a clutch-controlling member, means including a fluid motor for controlling the clutch-disengaging and engaging movements of said last named member, valve means operable by said mechanism for controlling the energization of said motor, other valve means controlled by the speed of said engine for effecting energization and deenergization of said motor, means for rendering the last named valve means inoperative to energize the fluid motor, irrespective of engine speed, when the said mechanism is operated to establish a predetermined gear ratio, and means operated by movement of said throttle-controlling member to a predetermined position for effecting deenergization of said motor.

2. In combination with an automotive vehicle engine having a throttle-controlling member, a gear-changing mechanism, a clutch-actuating member, means including a fluid motor for controlling the movements of said member, means for varying the fluid pressure in said motor in order to effect and control the clutch-disengaging and engaging movements of said member, said means including a pair of valves, one operated by said mechanism, and the other controlled by the speed of the engine, means for interconnecting said valves in such manner that the fluid pressure in said motor is exhausted from the speed-responsive valve through the mechanism-operated valve to control the clutch-engaging movement of said member and irrespective of the gear ratio established by said mechanism, and means controlled by movement of said throttle-controlling member to a predetermined position for exhausting fluid pressure from said motor independently of the speed-responsive valve.

3. In combination with an automotive vehicle engine having a throttle-controlling member, a gear-changing mechanism, a clutch-actuating member, means including a fluid motor for controlling the movements of said member, a source of fluid pressure, means including a centrifugally-controlled valve means for connecting said motor with said source when the mechanism is in one predetermined position, means dependent upon operation of the mechanism to another predetermined position for disconnecting the centrifugally-controlled valve means from the source, and means for connecting said motor with the atmosphere including a device operated by movement of the throttle-controlling member to a predetermined position.

4. In combination with an automotive vehicle engine having a throttle-controlling member, a gear-changing mechanism, a clutch-actuating member, means including a fluid motor for controlling the movements of said member, means including a centrifugally-controlled valve means for connecting said motor with a source of fluid pressure, valve means actuated by said mechanism for connecting the motor with the source, means actuated by the movement of the mechanism to a predetermined position for disconnecting the centrifugally-controlled valve means from said source, and means for connecting said motor with the atmosphere including a device operated by movement of the throttle-controlling member to a predetermined position.

5. In combination with an automotive vehicle engine having a throttle-controlling member, a gear-changing mechanism including a manually-operable element movable to selectively establish first, second, third or reverse gear ratios, a clutch-controlling member, means including a fluid motor for controlling the clutch-disengaging and engaging movements of said member, valve means operable in accordance with variations in the speed of said engine, means connecting said valve means with said motor, a source of fluid pressure, means connecting said valve means and source, means for rendering said last named connecting means inoperative to connect the valve means and source when said element is moved to establish second or third gear ratios, and means for connecting said motor with the atmosphere including a device operated by movement of the throttle-controlling member to a predetermined position.

6. In combination with an automotive vehicle engine having a throttle-controlling member, a gear-changing mechanism including a plurality of elements movable to establish different gear ratios, a clutch-controlling member, means including a fluid motor for controlling the clutch-disengaging and engaging movements of said member, valve means operable by movement of said elements for controlling the energization of said motor, other valve means controlled by the speed of said engine for effecting energization and deenergization of said motor, means for rendering the last named valve means inoperative to energize the fluid motor, irrespective of engine speed, said last named means including a valve operable by movement of one of said elements, and means for effecting deenergization of said motor in accordance with movement of said throttle-controlling member to a predetermined position.

7. In combination with an automotive vehicle engine having a throttle-controlling member, a gear-changing mechanism including a pair of shiftable elements, a clutch-actuating member, means including a fluid motor for controlling the movements of said member, means for varying the fluid pressure in said motor in order to effect and control the clutch-disengaging and engaging movements of said member, said means including a pair of valves, one operated by movement of one of said elements, and the other controlled by the speed of the engine, means including a valve operated by said one element for connecting said speed-controlled valve with a pressure source, means for interconnecting said pair of valves in such manner that the fluid pressure in said motor is exhausted from the speed-responsive valve by way of the element-operated valve to control the clutch-engaging movement of said member after establishment of the gear ratio determined by movement of said element, and means for exhausting fluid pressure from said motor in accordance with movement of said throttle-controlling member to a predetermined position.

8. In combination with an automotive vehicle engine having a throttle-controlling member, a gear-changing mechanism including a plurality of shiftable elements, a clutch-actuating member, means including a fluid motor for controlling the movements of said member, means including a centrifugally-controlled valve means for controlling the flow of fluid pressure to and from the motor, valve means actuated by movement of the elements for controlling the flow of fluid pressure to and from the motor, means operated by movement of one of said elements for rendering the centrifugally-controlled valve means inoperative to control the flow of fluid pressure to the motor when said one element is moved to a predetermined position, and means operated by movement of the throttle-controlling member to a predetermined position for controlling the flow of fluid pressure from the motor independently of said centrifugally-controlled valve means.

9. In combination with an automotive vehicle engine having a throttle-controlling member, a gear-changing mechanism including a plurality of shiftable elements, a clutch-actuating member, means including a fluid motor for controlling the movements of said member, a source of fluid pressure, means including a centrifugally-controlled valve means for connecting said motor with the source, valve means actuated by movement of said elements for connecting the motor with the source, means actuated by the movement of one of the elements to a predetermined position for disconnecting the centrifugally-controlled valve means from said source, and means for connecting said motor with the atmosphere comprising a valve operable upon movement of the throttle-controlling member to a predetermined position.

10. In combination with an automotive vehicle engine having a throttle-controlling member, a gear-changing mechanism including a plurality of shiftable elements, a clutch-actuating member, means including a fluid motor for controlling the movements of said member, valve means operable by movement of said elements in effecting all changes of gear to supply fluid pressure to said motor to cause clutch-disengaging movement of said member, other valve means responsive to the speed of the engine for conducting fluid pressure to and from the motor, means operated by one of said elements during movement thereof in either of opposite directions to effect predetermined changes of gear for rendering the last named valve means inoperative to supply fluid pressure to the motor, said last named means including a valve device operated by said one element, and a valve operated upon movement of said throttle-controlling member to a predetermined position for conducting fluid pressure from the motor.

11. In an automotive vehicle having an engine and throttle-controlling member, a clutch-controlling member, and a transmission of the type having a plurality of shift rails shiftable to establish a desired gear relation, a fluid motor for controlling disengaging and engaging movements of said clutch member, valve means responsive to the speed of the engine for controlling the flow of fluid to and from said motor, valve devices respectively operable by shifting movements of said rails for controlling the flow of fluid to and from said motor, valve mechanism operated by one of the rails during shifting movement thereof for controlling the communication between the speed-responsive valve means and a fluid pressure source, and means for connecting said valve means and valve devices whereby fluid from said motor is conducted to said valve means through said valve devices, said last named means including a valve operable in accordance with movement of said throttle-controlling member to a predetermined position.

12. A motor vehicle having an engine, gear shifting means, a vehicle controlling element, and a clutch-controlling member, a fluid motor operatively connected with the member for controlling clutch-disengaging and engaging movements thereof, a source of air under pressure, valve means for controlling the application and exhaust of air under pressure to and from said motor, means responsive to engine speed for controlling said valve means, and means controlled by said element independently of the operation of said gear shifting means and operable at will for exahusting said motor independently of said valve means and said speed-responsive means.

13. A motor vehicle having an engine, a throttle-controlling member and a clutch-controlling member, a fluid motor operatively connected with the last named member for controlling clutch-disengaging and engaging movements thereof, a source of air under pressure, valve means for controlling the application and exhaust of air under pressure to and from said motor, means responsive to engine speed for controlling said valve means, and means operated by movement of said throttle-controlling member to a predetermined position for fully exhausting said motor independently of the controlling action of said valve means and said speed-responsive means.

14. In a motor vehicle having an engine, a change-speed transmission provided with a pair of shiftable elements, a clutch-controlling member, and a throttle-controlling element, power means controlling the clutch member, means including valves associated with the shiftable elements for energizing the power means during shifting movement of either element, and means operated by movement of the throttle-controlling member to a predetermined position to deenergize the power means.

15. In a motor vehicle having an engine, a change-speed transmission provided with a pair of shiftable elements, a clutch-controlling member, and a throttle-controlling element, power means controlling the clutch member, means including valves associated with the shiftable elements for energizing the power means during shifting movement of either element, means responsive to the speed of the engine for normally controlling the deenergization of the motor for enabling clutch-engaging movement of the clutch member upon increase of engine speed above a predetermined value, and means operated by movement of the throttle-controlling member to a predetermined position for deenergizing said power means independently of the speed-responsive means.

16. In a motor vehicle having an engine, a change-speed transmission provided with a pair of shiftable elements, a clutch-controlling member, and a throttle-controlling element, power means controlling the clutch member, means operable by movement of said shiftable elements for energizing said power means, and means for controlling the deenergization of said power means, said last named means including a pair of valve devices, one device operable in accordance with changes in engine speed and the other actuated by movement of the throttle-controlling element.

17. In an automotive vehicle having an engine, an accelerator for controlling the speed of the engine, a controlling member and a transmission of the type having means movable in opposite directions from a neutral position to control the establishment of one or the other of a pair of gear ratios, a fluid motor operatively connected to said member, and means for controlling the energization of said motor including control mechanism operable by movement of the first named means to neutral position and a device connected in series with said control mechanism and operable on movement of said accelerator to a predetermined position for effecting energization of said motor.

18. In an automotive vehicle having an engine, an accelerator for controlling the speed of the engine, and a transmission of the type having means movable in opposite directions from neutral position to control the establishment of desired gear ratios, a controlling member for the vehicle, a fluid motor operatively connected with the said member, and means for controlling the energization of said motor comprising a source of energy and a circuit connected thereto and having a pair of devices arranged in series therein, one of said devices being controlled by movement of said first named means and the other device being actuated by movement of said accelerator to a predetermined position for effecting energization of said motor.

19. In an automotive vehicle having an engine, an accelerator for controlling the speed of the engine, a controlling member, and a transmission of the type having means movable in opposite directions from neutral position to control the establishment of desired gear ratios, a fluid motor operatively connected with said member, and a pair of serially connected devices controlled respectively by movement of the first named means to neutral position and by movement of the accelerator to release position for effecting energization of said motor.

20. In a motor vehicle having an engine, a change speed transmission provided with shiftable elements, a vehicle controlling member, and a throttle controlling element, a fluid motor for controlling said member, means including a valve associated with a shiftable element of the transmission and operable thereby for energizing said motor on shifting movement of said element to neutral position, and means including a second valve serially connected with said first named valve and operable on movement of said throttle controlling element to release position to connect said first named valve and motor.

21. In a motor vehicle having an engine, a change speed transmission provided with a shiftable element movable in either direction from a neutral position for establishing one or the other of a pair of gear ratios, a vehicle controlling element, and a throttle controlling element, a fluid motor connected with said vehicle controlling element, and means including a pair of serially connected valves operable respectively by movement of the shiftable element to neutral position and by release movement of the throttle controlling element for energizing said motor.

ARTHUR R. LEUKHARDT.